(12) United States Patent
Jochnowitz et al.

(10) Patent No.: US 11,384,743 B2
(45) Date of Patent: Jul. 12, 2022

(54) AEROSOL-GENERATING DEVICE COMPRISING A HEAT EXCHANGER

(71) Applicant: PHILIP MORRIS PRODUCTS S.A., Neuchatel (CH)

(72) Inventors: Evan Jochnowitz, Neuchatel (CH); Nicholas Martin Broadbent, Bristol (GB); Christopher James Rowe, Cambridge (GB); Michael Cane, Cambridge (GB)

(73) Assignee: PHILIP MORRIS PRODUCTS S.A., Neuchatel (CH)

( * ) Notice: Subject to any disclaimer, the term of this patent is extended or adjusted under 35 U.S.C. 154(b) by 736 days.

(21) Appl. No.: 15/100,896

(22) PCT Filed: Dec. 15, 2014

(86) PCT No.: PCT/EP2014/077747
§ 371 (c)(1),
(2) Date: Jun. 1, 2016

(87) PCT Pub. No.: WO2015/091351
PCT Pub. Date: Jun. 25, 2015

(65) Prior Publication Data
US 2016/0295915 A1    Oct. 13, 2016

(30) Foreign Application Priority Data
Dec. 16, 2013   (EP) ...................................... 13197483

(51) Int. Cl.
*F03G 7/06*    (2006.01)
*A24F 42/60*    (2020.01)
(Continued)

(52) U.S. Cl.
CPC ................ *F03G 7/06* (2013.01); *A24B 15/16* (2013.01); *A24F 42/10* (2020.01); *A24F 42/60* (2020.01)

(58) Field of Classification Search
None
See application file for complete search history.

(56) References Cited

U.S. PATENT DOCUMENTS 4,230,667 A * 10/1980 Williams ................... B01J 7/00
                                                          128/202.26
6,039,482 A    3/2000 Smal
(Continued)

FOREIGN PATENT DOCUMENTS

CN    201079011 Y    7/2008
CN    201098436 Y    8/2008
(Continued)

OTHER PUBLICATIONS

Combined Chinese Office Action and Search Report dated May 18, 2018 in Chinese Patent Application No. 201480065476.1 (with English translation), 16 pages
(Continued)

*Primary Examiner* — Phu H Nguyen
(74) *Attorney, Agent, or Firm* — Oblon, McClelland, Maier & Neustadt, L.L.P.

(57) ABSTRACT

An aerosol-generating device for use in an aerosol-generating system is provided, the aerosol-generating device including a cavity configured to receive an aerosol-generating article; a heat exchanger having a first portion proximate to the cavity and a second portion distal to the cavity for capturing heat from a lighter; and a retractable cover, wherein the retractable cover is movable from a first position in which the retractable cover covers the second portion of the heat-exchanger to a second position in which the second portion of the heat exchanger is exposed for heating by a
(Continued)

lighter and wherein the retractable cover is configured to automatically return from the second position to the first position when the second portion of the heat exchanger reaches a threshold temperature.

17 Claims, 2 Drawing Sheets

(51) Int. Cl.
    *A24F 42/10*     (2020.01)
    *A24B 15/16*     (2020.01)

(56) References Cited

U.S. PATENT DOCUMENTS

| | | | |
|---|---|---|---|
| 8,430,106 B2* | 4/2013 | Potter | A24F 47/004 |
| | | | 131/194 |
| 2005/0191115 A1 | 9/2005 | Heller | |
| 2010/0059070 A1 | 3/2010 | Potter et al. | |
| 2011/0290266 A1* | 12/2011 | Koller | A24F 47/006 |
| | | | 131/328 |
| 2013/0276804 A1 | 10/2013 | Hon | |
| 2015/0226432 A1* | 8/2015 | Borschke | F23Q 2/345 |
| | | | 431/253 |

FOREIGN PATENT DOCUMENTS

| | | |
|---|---|---|
| CN | 101500443 A | 8/2009 |
| CN | 101530821 A | 9/2009 |
| CN | 201878765 U | 6/2011 |
| EP | 0 395 291 A2 | 10/1990 |
| EP | 0 931 475 B1 | 3/2003 |
| GB | 2473264 A | 3/2011 |
| JP | 2010-520742 A | 6/2010 |
| JP | 2011-525366 A | 9/2011 |
| JP | 2016-508744 A | 3/2016 |
| RU | 122 000 U1 | 11/2012 |
| RU | 132 954 U1 | 10/2013 |
| WO | 2008/015441 A1 | 2/2008 |
| WO | WO 2008/121610 A1 | 10/2008 |
| WO | WO 2013/147492 A1 | 10/2013 |
| WO | WO 2014/139611 A1 | 9/2014 |

OTHER PUBLICATIONS

Decision to Grant dated Jun. 29, 2018 in Russian Patent Application No. 2016128830 (with English translation), 15 pages.
Russian Search Report dated Jun. 29, 2018 in Russian Patent Application No. 2016128830 (with English translation), 5 pages.
International Search Report and Written Opinion of the International Searching Authority dated Apr. 22, 2015, in PCT/EP2014/077747 Filed Dec. 15, 2014.
Office Action dated Nov. 15, 2018 in Japanese Patent Application No. 2016-532090, 5 pages (with English translation).

* cited by examiner

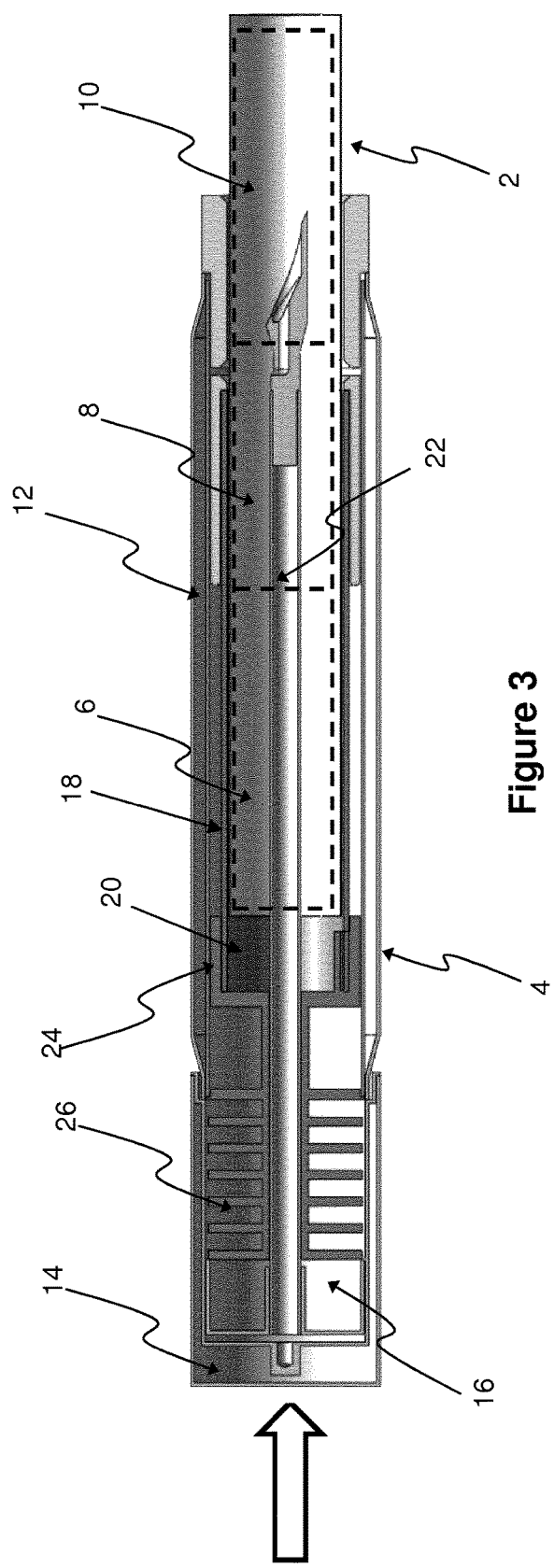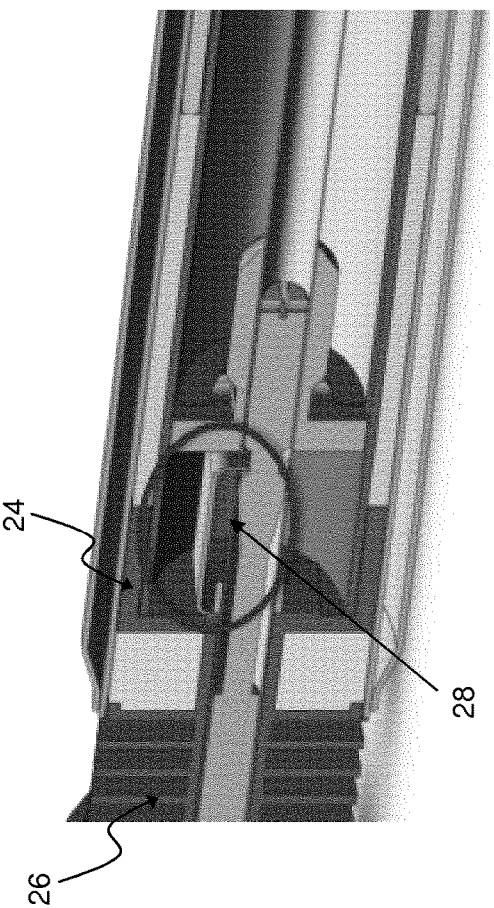
Figure 3
Figure 4

AEROSOL-GENERATING DEVICE COMPRISING A HEAT EXCHANGER

The present invention relates to an aerosol-generating device for use in an aerosol-generating system and an aerosol-generating system comprising an aerosol-generating device and an aerosol-generating article. In particular, the present invention relates to an aerosol-generating device and an aerosol-generating system for generating an aerosol comprising nicotine salt particles.

Devices for delivering nicotine to a user comprising a nicotine source and a volatile delivery enhancing compound source are known. For example, WO 2008/121610 A1 discloses a device in which nicotine and a volatile delivery enhancing compound are reacted with one another in the gas phase to form an aerosol of nicotine salt particles that is inhaled by the user. However, WO 2008/121610 A1 does not address how to optimize the ratio of nicotine to volatile delivery enhancing compound in the gas phase to minimize the amount of unreacted delivery enhancing compound vapour delivered to a user.

For example, if the vapour pressure of the volatile delivery enhancing compound is greater than that of nicotine, this can lead to a difference in the vapour concentration of the two reactants. Differences in the vapour concentration of the volatile delivery enhancing compound and nicotine can lead to the delivery of unreacted delivery enhancing compound vapour to a user.

It is desirable to produce a maximum quantity of nicotine salt particles for delivery to a user using a minimum quantity of reactants. Consequently, it would be desirable to provide an aerosol-generating system of the type disclosed in WO 2008/121610 A1 that further improves the formation of an aerosol of nicotine salt particles for delivery to a user. It is especially desirable to increase the proportion of the gas phase volatile delivery enhancing compound that is reacted with the gas phase nicotine.

According to the invention there is provided an aerosol-generating device for use in an aerosol-generating system, the aerosol-generating device comprises: a cavity configured to receive an aerosol-generating article; a heat exchanger having a first portion proximate to the cavity and a second portion distal to the cavity for capturing heat from a lighter; and a retractable cover. The retractable cover is movable from a first position in which the retractable cover covers the second portion of the heat-exchanger to a second position in which the second portion of the heat exchanger is exposed for heating by a lighter. The retractable cover is configured to automatically return from the second position to the first position when the second portion of the heat exchanger reaches a threshold temperature.

According to the invention there is also provided an aerosol-generating system comprising an aerosol-generating device according to the invention and an aerosol-generating article. In particular, there is provided an aerosol-generating system comprising an aerosol-generating device according to the invention and an aerosol-generating article, wherein the aerosol-generating article comprises: a nicotine source; and a delivery enhancing compound source.

As used herein, the term "aerosol-generating device" refers to a device that interacts with an aerosol-generating article to generate an aerosol that is directly inhalable into a user's lungs thorough the user's mouth.

As used herein, the term "aerosol-generating article" refers to an article comprising an aerosol-forming substrate capable of releasing volatile compounds, which can form an aerosol. In particular, the term "aerosol-generating article" refers to an article comprising a nicotine source and a delivery enhancing compound source capable of releasing nicotine and a delivery enhancing compound that can react with one another in the gas phase to form an aerosol.

As used herein, the term "lighter" refers to a blue flame lighter, torch lighter or any other lighter suitable for heating the second portion of the heat exchanger.

Aerosol-generating systems according to the invention comprise a proximal end through which, in use, an aerosol exits the aerosol-generating system for delivery to a user. The proximal end may also be referred to as the mouth end. In use, a user draws on the proximal end of the aerosol-generating article in order to inhale an aerosol generated by the aerosol-generating system. The aerosol-generating system comprises a distal end opposed to the proximal end.

As used herein, the term "longitudinal" is used to describe the direction between the proximal end and the opposed distal end of aerosol-generating systems and aerosol-generating devices according to the invention and the term "transverse" is used to describe the direction perpendicular to the longitudinal direction.

As used herein, by "length" is meant the maximum longitudinal dimension between the distal end and the proximal end of components, or portions of components, of aerosol-generating systems and aerosol-generating devices according to the invention.

As used herein, the terms "upstream" and "downstream" are used to describe the relative positions of components, or portions of components, of aerosol-generating systems and aerosol-generating devices according to the invention with respect to the direction of airflow through the aerosol-generating system when a user draws on the proximal end of the aerosol-generating system.

When a user draws on the proximal end of the aerosol-generating system, air is drawn into the aerosol-generating system, passes downstream through the aerosol-generating system and exits the aerosol-generating system at the proximal end.

The proximal end of aerosol-generating systems and aerosol-generating devices according to the invention may also be referred to as the downstream end and components, or portions of components, of aerosol-generating systems and aerosol-generating devices according to the invention may be described as being upstream or downstream of one another based on their positions relative to the airflow through the aerosol-generating system towards the proximal end.

The heat exchanger of the aerosol-generating device is configured to transfer thermal energy from a lighter to an aerosol-generating article received in the cavity of the aerosol-generating device in order to heat the aerosol-generating article to an operating temperature above ambient temperature.

As described further below, where the aerosol-generating article comprises a nicotine source and a delivery enhancing compound source, heating of the aerosol-generating article to an operating temperature above ambient temperature allows control of the amount of nicotine vapour and delivery enhancing compound vapour released from the nicotine source and the delivery enhancing compound source, respectively. This advantageously enables the vapour concentrations of the nicotine and delivery enhancing compound to be controlled and balanced proportionally to yield an efficient reaction stoichiometry. This advantageously improves the efficiency of the formation of an aerosol and the consistency of nicotine delivery to a user. It also advantageously reduces the delivery of unreacted nicotine vapour and unreacted delivery enhancing compound vapour to a user.

The heat exchanger of the aerosol-generating device has a first portion proximate to the cavity and a second portion distal to the cavity for capturing heat from a lighter. In use, the retractable cover of the aerosol-generating device is moved from the first position to the second position to expose the second portion of the heat exchanger.

With the retractable cover in the second position, a user may use a blue flame lighter, torch lighter or other suitable lighter to heat the second portion of the heat exchanger and thereby activate the aerosol-generating device in a manner similar to lighting a cigarette or other conventional smoking article. Heat captured from the lighter by the second portion of the heat exchanger is transferred by the first portion of the heat exchanger to an aerosol-generating article received in the cavity of the aerosol-generating device.

When the second portion of the heat exchanger reaches a threshold temperature, the retractable cover automatically returns from the second position to the first position in which the retractable cover covers the second portion of the heat-exchanger.

Automatic movement of the retractable cover from the second position to the first position when the second portion of the heat exchanger reaches a threshold temperature substantially reduces or prevents the capture of further heat from the lighter by the second portion of the heat exchanger. This advantageously avoids of reduces the risk of overheating of the aerosol-generating device, which could disadvantageously result in deterioration or decomposition of one or more components of the aerosol-generating device. This also substantially reduces or prevents the transfer of further heat by the first portion of the heat exchanger to an aerosol-generating article received in the cavity of the aerosol-generating device. This advantageously avoids of reduces the risk of overheating of the aerosol-generating article, which could disadvantageously result in deterioration or decomposition of one or more components of the aerosol-generating device. Where the aerosol-generating article comprises a nicotine source and a delivery enhancing compound source, this also advantageously reduces or avoids the risk of an undesirable aerosol being delivered to the user due to the release of excess nicotine vapour and delivery enhancing compound vapour from the nicotine source and delivery enhancing compound source, respectively.

As described above, automatic movement of the retractable cover from the second position to the first position when the second portion of the heat exchanger reaches a threshold temperature controls the maximum temperature that can be reached as a result of a user heating the second portion of the heat exchanger of the aerosol-generating device with a lighter. This advantageously avoids of reduces the risk of overheating of aerosol-generating devices and aerosol-generating articles of aerosol-generating systems according to the invention.

Automatic movement of the retractable cover of the aerosol-generating device from the second position to the first position when the second portion of the heat exchanger reaches a threshold temperature also advantageously provides a visual indication to the user that the aerosol-generating system has reached a suitable operating temperature and is ready for use.

Preferably, the retractable cover is manually movable from the first position to the second position by a user. In such embodiments, the maximum force required to be exerted by a user to manually move the retractable cover from the first position to the second position is preferably less than or equal to about 2 N.

The aerosol-generating device may comprise electrically actuated means for automatically returning the retractable cover from the second position to the first position when the second portion of the heat exchanger reaches a threshold temperature. For example, the aerosol-generating device may comprise electrically actuated means for automatically returning the retractable cover from the second position to the first position comprising an electronic temperature sensor and feedback system.

Preferably, the aerosol-generating device comprises mechanically actuated means for automatically returning the retractable cover from the second position to the first position when the second portion of the heat exchanger reaches a threshold temperature. This advantageously avoids the need for the aerosol-generating device to include a battery or other electrical power source.

In certain preferred embodiments, the aerosol-generating device comprises mechanical biasing means operable to bias the retractable cover in the first position and mechanical latching means operable to maintain the retractable cover in the second position until the second portion of the heat exchanger reaches a threshold temperature.

In certain particularly preferred embodiments, the aerosol-generating device comprises one or more springs operable to bias the retractable cover in the first position and latching means comprising a thermal bimetallic switch operable to maintain the retractable cover in the second position until the second portion of the heat exchanger reaches a threshold temperature. In such embodiments, the thermostatic bimetallic switch automatically releases the latching means when the second portion of the heat exchanger reaches a threshold temperature. Upon release of the latching means, the one or more springs operate to return the retractable cover from the second position to the first position.

Where the aerosol-generating article comprises a nicotine source and a delivery enhancing compound source, the threshold temperature is preferably between about 60 degrees Celsius and about 150 degrees Celsius. More, preferably between about 80 degrees Celsius and about 110 degrees Celsius.

The retractable cover of the aerosol-generating device may be movable towards the cavity from the first position to the second position and movable away from the cavity from the second position to the first position. For example, the retractable cover may be a retractable open-ended sleeve that circumscribes the second portion of the heat exchanger in the first position and the second portion of the heat exchanger in the second position.

Preferably, the retractable cover of the aerosol-generating device is movable away from the cavity from the first position to the second position and movable towards the cavity from the second position to the first position. In certain particularly preferred embodiments, the retractable cover of the aerosol-generating device is a retractable cap that is movable away from the cavity from the first position to the second position and movable towards the cavity from the second position to the first position. In such embodiments, the retractable cap surrounds the second portion of the heat exchanger in the first position and is longitudinally spaced apart from the second portion of the heat exchanger in the second position.

The heat exchanger of the aerosol-generating device may be formed of any suitable thermally conductive material or materials. Suitable materials include, but are not limited to, metals, such as aluminium and copper.

Preferably, the first portion of the heat exchanger of the aerosol-generating device comprises one or more thermally conductive hollow tubes.

In certain preferred embodiments, the first portion of the heat exchanger comprises one or more thermally conductive hollow tubes that circumscribe at least a portion of the length of the cavity.

Preferably, the second portion of the heat exchanger of the aerosol-generating device comprises a plurality of thermally conductive fins. The inclusion of a plurality of thermally conductive fins advantageously facilitates the capture of heat from a lighter by the second portion of the heat exchanger.

The first portion of the heat exchanger is configured to transfer heat captured from a lighter by the second portion of the heat exchanger to an aerosol-generating article received in the cavity of the aerosol-generating device.

The first portion of the heat exchanger may be configured to directly transfer heat to an aerosol-generating article received in the cavity of the aerosol-generating device.

Alternatively or in addition, the first portion of the heat exchanger may be configured to indirectly transfer heat to an aerosol-generating article received in the cavity of the aerosol-generating device.

As used herein, by "indirectly" is meant the first portion of the heat exchanger is configured to transfer heat to an aerosol-generating article received in the cavity of the aerosol-generating device via one or more other components of the aerosol-generating device.

In certain particularly preferred embodiments, the aerosol-generating device is used in cooperation with an aerosol-generating article comprising a nicotine source and a delivery enhancing compound source. However, it will be appreciated that aerosol-generating devices according to the invention may be used in cooperation with other types of aerosol-generating article.

In such embodiments, the first portion of the heat exchanger may be configured to transfer heat to one or both of the nicotine source and the delivery enhancing compound source of the aerosol-generating article. Preferably, the first portion of the heat exchanger is configured to transfer heat to the nicotine source of the aerosol-generating article.

In certain particularly preferred embodiments, the aerosol-generating device is used in cooperation with an aerosol-generating article comprising a nicotine source, a delivery enhancing compound source, and a heat transfer barrier between the nicotine source and the delivery enhancing compound source.

In such embodiments, the heat transfer barrier separates the nicotine source and the delivery enhancing compound source of the aerosol-generating article and is configured to reduce heat transfer between the nicotine source and the delivery enhancing compound source of the aerosol-generating article.

Inclusion of a heat transfer barrier between the nicotine source and the delivery enhancing compound source of the aerosol-generating article advantageously enables the delivery enhancing compound source of the aerosol-generating article to be maintained at a lower temperature while the nicotine source is heated to a higher temperature. In particular, inclusion of a heat transfer barrier between the nicotine source and the delivery enhancing compound source advantageously enables the nicotine delivery of the aerosol-generating system to be significantly increased by increasing the temperature of the nicotine source while the delivery enhancing compound source is maintained at a temperature below the thermal decomposition temperature of the delivery enhancing compound.

As used herein, "heat transfer barrier" is used to describe a physical barrier that reduces the amount of heat transferred from the nicotine source to the delivery enhancing compound source compared to an aerosol-generating article in which no barrier is present. The physical barrier may comprise a solid material. Alternatively or in addition, the physical barrier may comprise a gas, vacuum or partial vacuum between the nicotine source and the delivery enhancing compound source of the aerosol-generating article.

In such embodiments, the first portion of the heat exchanger is preferably configured to transfer heat to the nicotine source of the aerosol-generating article in order to heat the nicotine source to a temperature of between about 80° C. and about 150° C.

In such embodiments, the heat transfer barrier is preferably configured so that in use the temperature of the delivery enhancing compound source is below about 60° C. when the nicotine source is heated to a temperature of between 80° C. and 150° C.

Preferably, the cavity of the aerosol-generating device is substantially cylindrical.

The cavity of the aerosol-generating device may have a transverse cross-section of any suitable shape. For example, the cavity may be of substantially circular, elliptical, triangular, square, rhomboidal, trapezoidal, pentagonal, hexagonal or octagonal transverse cross-section.

Preferably, the cavity of the aerosol-generating device has a transverse cross-section of substantially the same shape as the transverse cross-section of the aerosol-generating article to be received in the cavity.

In certain embodiments, the cavity of the aerosol-generating device may have a transverse cross-section of substantially the same shape and dimensions as the transverse cross-section of the aerosol-generating article to be received in the cavity in order to maximize conductive thermal transfer from the aerosol-generating device to the aerosol-generating article.

As used herein, the term "transverse cross-section" is used to describe the cross-section of the cavity and the aerosol-generating article perpendicular to the major axis of the cavity and the aerosol-generating article, respectively.

Preferably, the cavity of the aerosol-generating device is of substantially circular transverse cross-section or of substantially elliptical transverse cross-section. Most preferably, the cavity of the aerosol-generating device is of substantially circular transverse cross-section.

Preferably, the length of the cavity of the aerosol-generating device is less than the length of the aerosol-generating article so that when the aerosol-generating article is received in the cavity of the aerosol-generating device the proximal or downstream end of the aerosol-generating article projects from the cavity of the aerosol-generating device.

Preferably, the cavity of the aerosol-generating device has a diameter substantially equal to or slightly greater than the diameter of the aerosol-generating article.

As used herein, by "diameter" is meant the maximum transverse dimension of the cavity and the aerosol-generating article.

In certain particularly preferred embodiments, the aerosol-generating device further comprises a first solid-liquid phase-change material positioned about a perimeter of the cavity, wherein the first portion of the heat-exchanger is configured to heat the first solid-liquid phase-change material to a temperature above the melting point of the first solid-liquid phase-change material.

In such preferred embodiments the first portion of the heat exchanger is in thermal contact with the first solid-liquid phase-change material and is configured to transfer heat captured from the lighter by the second portion of the heat exchanger to the first solid-liquid phase-change material.

In use, when heated to its melting point by the first portion of the heat-exchanger of the aerosol-generating device, the first solid-liquid phase-change material absorbs thermal energy as it changes phase from a solid to a liquid. Upon subsequent cooling, the first solid-liquid phase-change material releases the absorbed thermal energy as it changes phase from a liquid to a solid.

The thermal energy released by the first solid-liquid phase-change material as it solidifies heats an aerosol-generating article received in the cavity of the aerosol-generating device to an operating temperature above ambient temperature.

The first solid-liquid phase-change material is positioned about the perimeter of the cavity of the aerosol-generating device so that thermal energy released by the first solid-liquid phase-change material as it changes phase from a liquid to a solid heats an aerosol-generating article received in the cavity.

The first solid-liquid phase-change material may extend fully or partially around the circumference of the cavity. Preferably, the first solid-liquid phase-change material extends fully around the circumference of the cavity.

The first solid-liquid phase-change material may extend fully or partially along the length of the cavity.

The first solid-liquid phase-change material may be any suitable material having a melting point in a desired operating temperature range of the aerosol-generating system and a high latent heat of fusion.

Preferably, the first solid-liquid phase-change material has a melting point of between about 30 degrees Celsius and about 70 degrees Celsius. In certain embodiments, the first solid-liquid phase-change material may have a melting point of between about 40 degrees Celsius and about 60 degrees Celsius.

Preferably, the first solid-liquid phase-change material has a latent heat of fusion of at least about 150 kJ/kg, more preferably at least 200 kJ/kg, most preferably at least 250 kJ/kg.

Preferably, the first solid-liquid phase-change material has a thermal conductivity of at least about 0.5 $W \cdot m^{-1} \cdot K$.

Preferably, the first solid-liquid phase-change material undergoes small volumetric changes on phase change from a solid to a liquid and from a liquid to a solid.

Preferably, the first solid-liquid phase-change material has a low vapour pressure in the desired operating temperature range of the aerosol-generating system.

Preferably, the first solid-liquid phase-change material is non-flammable.

Examples of suitable first solid-liquid phase-change materials for use in aerosol-generating devices according to the invention include, but are not limited to: organic phase-change materials, such as fatty acids and paraffins; and inorganic phase-change materials, such as inorganic salt hydrates.

Suitable fatty acids for use as the first solid-liquid phase-change material include, but are not limited to: lauric acid and myristic acid. Suitable paraffins for use as the first solid-liquid phase-change material include, but are not limited to: icosane, pentacosane, hexacosane, heptacosane, octasosane, nonacosane, n-triacontane, hentriacontane, dotriacontane and tritriacontane.

In preferred embodiments, the first solid-liquid phase-change material is an inorganic salt hydrate. Suitable inorganic salt hydrates for use as the first solid-liquid phase-change material include, but are not limited to: phosphoric acid disodium salt dodecahydrate, calcium nitrate tetrahydrate, sodium thiosulfate pentahydrate and sodium acetate trihydrate.

In particularly preferred embodiments, the first solid-liquid phase-change material is sodium acetate trihydrate.

The amount of first solid-liquid phase-change material in the aerosol-generating device should be sufficient for the first solid-liquid phase-change material to release enough thermal energy as it changes phase from a liquid to a solid to heat the aerosol-generating article to a desired operating temperature range of the aerosol-generating system.

Preferably, the first solid-liquid phase-change material in the aerosol-generating device is configured to release at least about 250 J of thermal energy, more preferably at least about 500 J of thermal energy, as it changes phase from a liquid to a solid.

In certain preferred embodiments, the first solid-liquid phase-change material in the aerosol-generating device is configured to release at between about 250 J and about 1500 J of thermal energy, more preferably between about 500 J and about 1250 J of thermal energy, as it changes phase from a liquid to a solid.

Preferably, the first solid-liquid phase-change material is configured to heat an aerosol-generating article received in the cavity of the aerosol-generating device to at least about 40 degrees Celsius. More preferably, the first solid-liquid phase-change material is configured to heat an aerosol-generating article received in the cavity of the aerosol-generating device to at least about 40 degrees Celsius within about 10 seconds to about 15 seconds.

In certain preferred embodiments, the first solid-liquid phase-change material is configured to heat an aerosol-generating article received in the cavity of the aerosol-generating device to between about 40 degrees Celsius and 60 degrees Celsius. In certain particularly preferred embodiments, the first solid-liquid phase-change material is configured to heat an aerosol-generating article received in the cavity of the aerosol-generating device to between about 40 degrees Celsius and 60 degrees Celsius within about 10 seconds to about 15 seconds.

Preferably, the first solid-liquid phase-change material is configured to release thermal energy for between about 3 minutes and about 10 minutes as it changes phase from a liquid to a solid.

As stated above, in certain particularly preferred embodiments the aerosol-generating device is used in cooperation with an aerosol-generating article comprising a nicotine source and a delivery enhancing compound source.

In such embodiments, the first solid-liquid phase-change material may be configured to heat one or both of the nicotine source and the delivery enhancing compound source of the aerosol-generating article. Preferably, the first solid-liquid phase-change material is configured to heat the nicotine source of the aerosol-generating article.

As also stated above, in certain particularly preferred embodiments, the aerosol-generating device is used in cooperation with an aerosol-generating article comprising a nicotine source, a delivery enhancing compound source, and a heat transfer barrier between the nicotine source and the delivery enhancing compound source.

In such embodiments, the first solid-liquid phase-change material is preferably configured to heat the nicotine source of the aerosol-generating article to a temperature of between about 80° C. and about 150° C.

In such embodiments, the heat transfer barrier is preferably configured so that in use the temperature of the delivery enhancing compound source is below about 60° C. when the nicotine source is heated to a temperature of between 80° C. and 150° C.

Where aerosol-generating devices according to the invention comprise a first solid-liquid phase-change material positioned about a perimeter of the cavity, automatic movement of the retractable cover from the second position to the first position when the second portion of the heat exchanger reaches a threshold temperature advantageously reduces the risk of overheating of the first solid-liquid phase-change material by the first portion of the heat exchanger. By reducing the risk of overheating of the first solid-liquid phase-change material, the retractable cap advantageously increases the operational lifetime of the aerosol-generating device.

To further reduce the risk of overheating of the first solid-liquid phase-change material by the first portion of the heat exchanger, the aerosol-generating device preferably further comprises a second solid-liquid phase-change material, wherein the melting point of the second solid-liquid phase-change material is higher than the melting point of the first solid-liquid phase-change material.

Upon heating, once the first solid-liquid phase-change material has changed phase from a solid to a liquid, the first solid-liquid phase-change material may continue to absorb additional thermal energy from the first portion of the heat exchanger. This will cause the temperature of the first solid-liquid phase-change material to continue to rise above its melting point and in the absence of a second solid-liquid phase-change material could result in overheating of the first solid-liquid phase-change material.

However, where the aerosol-generating device comprises a second solid-liquid phase-change material with a higher melting point than the first solid-liquid phase-change material, the second solid-liquid phase-change material undergoes a phase change from solid to liquid when the temperature of the first solid-liquid phase-change material reaches the melting point of the second solid-liquid phase-change material. As it undergoes the phase change from solid to liquid the second solid-liquid phase-change material absorbs thermal energy. The second solid-liquid phase-change material thereby buffers the amount of additional thermal energy absorbed by the first solid-liquid phase-change material. This reduces the risk of overheating of the first solid-liquid phase-change material.

By reducing the risk of overheating of the first solid-liquid phase-change material, the inclusion of a second solid-liquid phase-change material also advantageously increases the operational lifetime of the aerosol-generating device.

Preferably, the melting point of the second solid-liquid phase-change material is between 15 degrees Celsius and 25 degrees Celsius higher than the melting point of the first solid-liquid phase-change material.

Preferably, the second solid-liquid phase-change material has a melting point of between about 70 degrees Celsius and about 90 degrees Celsius.

Preferably, the second solid-liquid phase-change material has a latent heat of fusion of at least about 150 kJ/kg, more preferably at least 200 kJ/kg.

Preferably, the second solid-liquid phase-change material undergoes small volumetric changes on phase change from a solid to a liquid and from a liquid to a solid.

Preferably, the second solid-liquid phase-change material has a low vapour pressure in the desired operating temperature range of the aerosol-generating system.

Preferably, the second solid-liquid phase-change material is non-flammable.

Examples of suitable second solid-liquid phase-change materials for use in aerosol-generating devices according to the invention include, but are not limited to: organic phase-change materials, such as paraffins; and inorganic phase-change materials, such as inorganic salt hydrates.

Suitable paraffins for use as the second solid-liquid phase-change material include, but are not limited to: triatriacontane, tetratriacontane, pentatriacontane, hexatriacontane, heptatriacontane, octatriacontane, nonatriacontane, tertracontane, hentetracontane and dotetracontane.

Suitable inorganic salt hydrates for use as the second solid-liquid phase-change material include, but are not limited to: magnesium nitrate hexahydrate and magnesium chloride hexahydrate.

In preferred embodiments, the second solid-liquid phase-change material is a paraffin.

In particularly preferred embodiments, the second solid-liquid phase-change material is hexatriacontane.

The second solid-liquid phase-change material is in thermal contact with the first solid-liquid phase-change material and the first portion of the heat exchanger.

Preferably, thermal energy is transferred from the first portion of the heat exchanger to the first solid-liquid phase-change material via the second solid-liquid phase-change material.

The second solid-liquid phase-change material may be positioned upstream of the cavity and the first solid-liquid phase-change material.

Alternatively, the second solid-liquid phase-change material may be positioned about the perimeter of the cavity. In such embodiments, the second solid-liquid phase-change material may be upstream of the first solid-liquid phase-change material, downstream of the first solid-liquid phase-change material or may circumscribe the first solid-liquid phase-change material.

As described above, where the aerosol-generating device comprises a first solid-liquid phase-change material, the first portion of the heat exchanger is in thermal contact with the first solid-liquid phase-change material. Where the aerosol-generating device further comprises a second solid-liquid phase-change material, the first portion of the heat exchanger is also in thermal contact with the second solid-liquid phase-change material. In such embodiments, the first portion of the heat exchanger, first solid-liquid phase-change material and second solid-liquid phase-change material are preferably configured so that thermal energy is transferred from the first portion of the heat exchanger to the second phase solid-liquid phase-change material and then from the second solid-liquid phase-change material to the first solid-liquid phase-change material.

In certain preferred embodiments, the first portion of the heat exchanger surrounds the first solid-liquid phase-change material. For example, the first portion of the heat exchanger may comprise a hollow thermally conductive tube that surrounds the first solid-liquid phase-change material.

Alternatively or in addition, where the aerosol-generating device comprises a second solid-liquid phase-change material, the first portion of the heat exchanger may surround the second solid-liquid phase-change material.

The aerosol-generating device may comprise a housing containing the cavity, first portion of the heat exchanger and, where present, first solid-liquid phase-change material and second solid-liquid phase-change material.

The first portion of the heat exchanger and, where present, first solid-liquid phase-change material and second solid-liquid phase-change material may be spaced from the housing by an air gap or a layer of insulation.

The housing may be designed to be grasped or held by a user.

Preferably, the housing is substantially cylindrical.

In certain preferred embodiments, the housing and retractable cover of the aerosol-generating device form a cylindrical heating sleeve.

In certain particularly preferred embodiments, the aerosol-generating device is used in cooperation with an aerosol-generating article comprising a first compartment comprising a nicotine source and a second compartment comprising a delivery enhancing compound source.

As used herein, the term "compartment" is used to describe a chamber or container within the aerosol-generating article comprising the nicotine source or the delivery enhancing compound source.

In such embodiments, the aerosol-generating device preferably further comprises a piercing member positioned within the cavity of the aerosol-generating device for piercing the first compartment and the second compartment of the aerosol-generating article. The piercing member may be formed from any suitable material.

The first compartment and the second compartment of the aerosol-generating article may abut one another. Alternatively, the first compartment and the second compartment of the aerosol-generating article may be spaced apart from one another.

The first compartment of the aerosol-generating article may be sealed by one or more frangible barriers. In certain preferred embodiments, the first compartment is sealed by a pair of opposed transverse frangible barriers.

Alternatively or in addition, the second compartment of the aerosol-generating article may be sealed by one or more frangible barriers. In certain preferred embodiments, the second compartment is sealed by a pair of opposed transverse frangible barriers.

The one or more frangible barriers may be formed from any suitable material. For example, the one or more frangible barriers may be formed from a metal foil or film.

In such embodiments, the aerosol-generating device preferably further comprises a piercing member positioned within the cavity of the aerosol-generating device for piercing the one or more frangible barriers sealing one or both of the first compartment and the second compartment of the aerosol-generating article.

The volume of the first compartment and the second compartment may be the same or different. In certain preferred embodiment, the volume of the first compartment is greater than the volume of the second compartment.

As described further below, the first compartment and the second compartment may be arranged in series or parallel within the aerosol-generating article.

As used herein, by "series" it is meant that the first compartment and the second compartment are arranged within the aerosol-generating article so that in use an air stream drawn through the aerosol-generating article passes through one of the first compartment and the second compartment and then passes through the other of the first compartment and the second compartment. Nicotine vapour is released from the nicotine source in the first compartment into the air stream drawn through the aerosol-generating article and delivery enhancing compound is released from the delivery enhancing compound source in the second compartment into the air stream drawn through the aerosol-generating article. The nicotine vapour reacts with the delivery enhancing compound vapour in the gas phase to form an aerosol, which is delivered to a user.

Where the first compartment and the second compartment are arranged in series within the aerosol-generating article, the second compartment is preferably downstream of the first compartment so that in use an air stream drawn through the aerosol-generating article passes through the first compartment and then passes through the second compartment.

Location of the second compartment comprising the delivery enhancing compound source downstream of the first compartment comprising the nicotine source advantageously improves the consistency of the nicotine delivery of aerosol-generating systems according to the invention.

Without being bound by theory, it is believed that location of the delivery enhancing compound source downstream of the nicotine source reduces or prevents deposition of delivery enhancing compound vapour released from the delivery enhancing compound source on the nicotine source during use. This reduces fading over time of the nicotine delivery in aerosol-generating systems according to the invention.

In such embodiments, the nicotine vapour may react with the delivery enhancing compound vapour in the second compartment to form an aerosol. In such embodiments the aerosol-generating article may further comprise a third compartment downstream of the second compartment and the nicotine vapour may alternatively or in addition react with the delivery enhancing compound vapour in the third compartment to form an aerosol.

Where the first compartment and the second compartment are arranged in series within the aerosol-generating article, the aerosol-generating device may further comprise a piercing member positioned centrally within the cavity of the aerosol-generating device, along the major axis of the cavity, for piercing the first compartment and the second compartment of the aerosol-generating article.

As used herein, by "parallel" it is meant that the first compartment and the second compartment are arranged within the aerosol-generating article so that in use a first air stream drawn through the aerosol-generating article passes through the first compartment and a second air stream drawn through the aerosol-generating article passes through the second compartment. Nicotine vapour is released from the nicotine source in the first compartment into the first air stream drawn through the aerosol-generating article and delivery enhancing compound vapour is released from the delivery enhancing compound source in the second compartment into the second air stream drawn through the aerosol-generating article. The nicotine vapour in the first air stream reacts with the delivery enhancing compound vapour in the second air stream in the gas phase to form an aerosol, which is delivered to a user.

In such embodiments the aerosol-generating article may further comprise a third compartment downstream of the first compartment and the second compartment and the nicotine vapour in the first air stream may mix and react with the delivery enhancing compound vapour in the second air stream in the third compartment to form an aerosol.

Where the first compartment and the second compartment of the aerosol-generating article are arranged in parallel within the aerosol-generating article, the aerosol-generating device may further comprise a piercing member comprising a first piercing member positioned within the cavity of the aerosol-generating device for piercing the first compartment of the aerosol-generating article and a second piercing member positioned within the cavity of the aerosol-generating device for piercing the second compartment of the aerosol-generating article.

In particularly preferred embodiments, the aerosol-generating article comprises: a housing comprising: an air inlet; a first compartment in communication with the air inlet, the first compartment comprising a first one of a nicotine source and a delivery enhancing compound source; a second compartment in communication with the first compartment, the second compartment comprising a second one of the nicotine source and the delivery enhancing compound source; and an air outlet, wherein the air inlet and the air outlet are in communication with each other and configured so that air may pass into the housing through the air inlet, through the housing and out of the housing through the air outlet.

As used herein, the term "air inlet" is used to describe one or more apertures through which air may be drawn into the aerosol-generating article.

As used herein, the term "air outlet" is used to describe one or more aperture through which air may be drawn out of the aerosol-generating article.

In such embodiments, the first compartment and the second compartment are arranged in series from air inlet to air outlet within the housing. That is, the first compartment is downstream of the air inlet, the second compartment is downstream of the first compartment and the air outlet is downstream of the second compartment. In use, a stream of air is drawn into the housing through the air inlet, downstream through the first compartment and the second compartment and out of the housing through the air outlet.

In such embodiments, the first compartment preferably comprises the nicotine source and the second compartment preferably comprises the delivery enhancing source.

The aerosol-generating article may further comprise a third compartment in communication with: the second compartment; and the air outlet. In use in such embodiments, a stream of air is drawn into the housing through the air inlet, downstream through the first compartment, the second compartment and the third compartment and out of the housing through the air outlet.

The aerosol-generating article may further comprise a mouthpiece in communication with: the second compartment, or the third compartment, where present; and the air outlet. In use in such embodiments, a stream of air is drawn into the housing through the air inlet, downstream through the first compartment, the second compartment, the third compartment, where present, and the mouthpiece and out of the housing through the air outlet.

In other preferred embodiments, the aerosol-generating article comprises: a housing comprising: an air inlet; a first compartment in communication with the air inlet, the first compartment comprising a nicotine source; a second compartment in communication with the air inlet, the second compartment comprising a delivery enhancing compound source; and an air outlet, wherein the air inlet and the air outlet are in communication with each other and configured so that air may pass into the housing through the air inlet, through the housing and out of the housing through the air outlet.

In such embodiments, the first compartment and the second compartment are arranged in parallel from air inlet to air outlet within the housing. The first compartment and the second compartment are both downstream of the air inlet and upstream of the air outlet. In use, a stream of air is drawn into the housing through the air inlet, a first portion of the stream of air is drawn downstream through the first compartment and a second portion of the stream of air is drawn downstream through the second compartment.

The aerosol-generating article may further comprise a third compartment in communication with: one or both of the first compartment and the second compartment; and the air outlet.

The aerosol-generating article may further comprise a mouthpiece in communication with: the first compartment and the second compartment, or the third compartment, where present; and the air outlet.

In further preferred embodiments, the aerosol-generating article comprises: a housing comprising: a first air inlet; a second air inlet; a first compartment in communication with the first air inlet, the first compartment comprising a nicotine source; a second compartment in communication with the second air inlet, the second compartment comprising a delivery enhancing compound source; and an air outlet, wherein the first air inlet, the second air inlet and the air outlet are in communication with each other and configured so that air may pass into the housing through the first air inlet, through the housing and out of the housing through the air outlet and air may pass into the housing through the first air inlet, through the housing and out of the housing through the air outlet.

In such embodiments, the first compartment and the second compartment are arranged in parallel within the housing. The first compartment is downstream of the first air inlet and upstream of the air outlet and the second compartment is downstream of the second air inlet and upstream of the air outlet. In use, a first stream of air is drawn into the housing through the first air inlet and downstream through the first compartment and a second stream of air is drawn into the housing through the second air inlet and downstream through the second compartment.

The aerosol-generating article may further comprise a third compartment in communication with: one or both of the first compartment and the second compartment; and the air outlet.

The aerosol-generating article may further comprise a mouthpiece in communication with: the first compartment and the second compartment, or the third compartment, where present; and the air outlet.

The housing of the aerosol-generating article may simulate the shape and dimensions of a tobacco smoking article, such as a cigarette, a cigar, a cigarillo or a pipe, or a cigarette pack. In a preferred embodiment, the housing simulates the shape and dimensions of a cigarette.

Where present, the third compartment may comprise one or more aerosol-modifying agents. For example, the third compartment may comprise an adsorbent, such as activated carbon, a flavourant, such as menthol, or a combination thereof.

Where present, the mouthpiece may comprise a filter. The filter may have a low particulate filtration efficiency or very low particulate filtration efficiency. Alternatively, the mouthpiece may comprise a hollow tube.

The aerosol-generating article preferably comprises a volatile delivery enhancing compound source. As used herein, by "volatile" it is meant the delivery enhancing compound has a vapour pressure of at least about 20 Pa. Unless otherwise stated, all vapour pressures referred to herein are vapour pressures at 25° C. measured in accordance with ASTM E1194-07.

Preferably, the volatile delivery enhancing compound has a vapour pressure of at least about 50 Pa, more preferably at least about 75 Pa, most preferably at least 100 Pa at 25° C.

Preferably, the volatile delivery enhancing compound has a vapour pressure of less than or equal to about 400 Pa, more preferably less than or equal to about 300 Pa, even more preferably less than or equal to about 275 Pa, most preferably less than or equal to about 250 Pa at 25° C.

In certain embodiments, the volatile delivery enhancing compound may have a vapour pressure of between about 20 Pa and about 400 Pa, more preferably between about 20 Pa and about 300 Pa, even more preferably between about 20 Pa and about 275 Pa, most preferably between about 20 Pa and about 250 Pa at 25° C.

In other embodiments, the volatile delivery enhancing compound may have a vapour pressure of between about 50 Pa and about 400 Pa, more preferably between about 50 Pa and about 300 Pa, even more preferably between about 50 Pa and about 275 Pa, most preferably between about 50 Pa and about 250 Pa at 25° C.

In further embodiments, the volatile delivery enhancing compound may have a vapour pressure of between about 75 Pa and about 400 Pa, more preferably between about 75 Pa and about 300 Pa, even more preferably between about 75 Pa and about 275 Pa, most preferably between about 75 Pa and about 250 Pa at 25° C.

In yet further embodiments, the volatile delivery enhancing compound may have a vapour pressure of between about 100 Pa and about 400 Pa, more preferably between about 100 Pa and about 300 Pa, even more preferably between about 100 Pa and about 275 Pa, most preferably between about 100 Pa and about 250 Pa at 25° C.

The volatile delivery enhancing compound may comprise a single compound. Alternatively, the volatile delivery enhancing compound may comprise two or more different compounds.

Where the volatile delivery enhancing compound comprises two or more different compounds, the two or more different compounds in combination preferably have a vapour pressure of at least about 20 Pa at 25° C.

Preferably, the delivery enhancing compound is a volatile liquid.

The delivery enhancing compound may comprise a mixture of two or more different liquid compounds.

The delivery enhancing compound may comprise an aqueous solution of one or more compounds. Alternatively the delivery enhancing compound may comprise a non-aqueous solution of one or more compounds.

The delivery enhancing compound may comprise two or more different volatile compounds. For example, the delivery enhancing compound may comprise a mixture of two or more different volatile liquid compounds.

Alternatively, the delivery enhancing compound may comprise one or more non-volatile compounds and one or more volatile compounds. For example, the delivery enhancing compound may comprise a solution of one or more non-volatile compounds in a volatile solvent or a mixture of one or more non-volatile liquid compounds and one or more volatile liquid compounds.

In certain embodiments, the delivery enhancing compound comprises an acid. The delivery enhancing compound may comprise an organic acid or an inorganic acid. Preferably, the delivery enhancing compound comprises an organic acid, more preferably a carboxylic acid, most preferably an alpha-keto or 2-oxo acid.

In certain preferred embodiments, the delivery enhancing compound comprises an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid and combinations thereof. In certain particularly preferred embodiments, the delivery enhancing compound comprises pyruvic acid.

In certain preferred embodiments, the delivery enhancing compound source comprises a sorption element and a delivery enhancing compound sorbed on the sorption element.

As used herein, by "sorbed" it is meant that the delivery enhancing compound is adsorbed on the surface of the sorption element, or absorbed in the sorption element, or both adsorbed on and absorbed in the sorption element. Preferably, the delivery enhancing compound is adsorbed on the sorption element.

The sorption element may be formed from any suitable material or combination of materials. For example, the sorption element may comprise one or more of glass, stainless steel, aluminium, polyethylene (PE), polypropylene, polyethylene terephthalate (PET), polybutylene terephthalate (PBT), polytetrafluoroethylene (PTFE), expanded polytetrafluoroethylene (ePTFE), and BAREX®.

In a preferred embodiment, the sorption element is a porous sorption element.

For example, the sorption element may be a porous sorption element comprising one or more materials selected from the group consisting of porous plastic materials, porous polymer fibres and porous glass fibres.

The sorption element is preferably chemically inert with respect to the delivery enhancing compound.

The sorption element may have any suitable size and shape.

In certain preferred embodiments, the sorption element is a substantially cylindrical plug.

In one particularly preferred embodiment, the sorption element is a porous substantially cylindrical plug.

In other preferred embodiments, the sorption element is a substantially cylindrical hollow tube. In another particularly preferred embodiment, the sorption element is a porous substantially cylindrical hollow tube.

The size, shape and composition of the sorption element may be chosen to allow a desired amount of delivery enhancing compound to be sorbed on the sorption element.

In certain preferred embodiments, between about 20 µl and about 200 µl, more preferably between about 40 µl and about 150 µl, most preferably between about 50 µl and about 100 µl of the delivery enhancing compound is sorbed on the sorption element.

The sorption element advantageously acts as a reservoir for the delivery enhancing compound.

The nicotine source may comprise one or more of nicotine, nicotine base, a nicotine salt, such as nicotine-HCl, nicotine-bitartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent or a liquid tobacco extract.

The nicotine source may further comprise an electrolyte forming compound. The electrolyte forming compound may be selected from the group consisting of alkali metal hydroxides, alkali metal oxides, alkali metal salts, alkaline earth metal oxides, alkaline earth metal hydroxides and combinations thereof.

For example, the nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulfate and combinations thereof In certain embodiments, the nicotine source may comprise an aqueous solution of nicotine, nicotine base, a nicotine salt or a nicotine derivative and an electrolyte forming compound.

Alternatively or in addition, the nicotine source may further comprise other components including, but not limited to, natural flavours, artificial flavours and antioxidants.

The nicotine source may comprise a sorption element and nicotine sorbed on the sorption element.

The aerosol-generating article is preferably substantially cylindrical in shape.

The aerosol-generating article may have a transverse cross-section of any suitable shape.

Preferably, the aerosol-generating article is of substantially circular transverse cross-section or of substantially elliptical transverse cross-section. More preferably, the aerosol-generating article is of substantially circular transverse cross-section.

The aerosol-generating article may simulate the shape and dimensions of a tobacco smoking article, such as a cigarette, a cigar, a cigarillo or a pipe, or a cigarette pack. In a preferred embodiment, the aerosol-generating article simulates the shape and dimensions of a cigarette.

For the avoidance of doubt, features described above in relation to one embodiment of the invention may also be applicable to other embodiment of the invention. In particular, features described above in relation to aerosol-generating devices according to the invention may also relate, where appropriate to aerosol-generating systems according to the invention, and vice versa.

The invention will now be further described with reference to the accompanying drawings in which.

Figure 1:
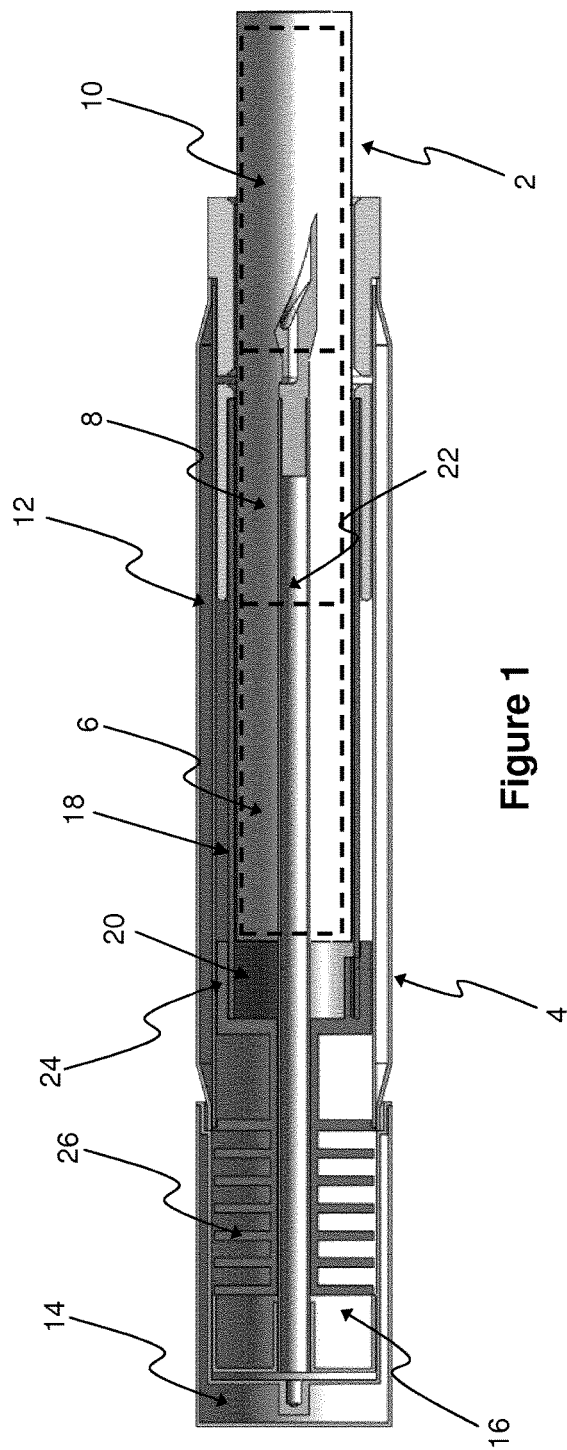
FIG. 1 shows a schematic longitudinal cross-section of an aerosol-generating system according to a first embodiment of the invention with the retractable cover of the aerosol-generating device in the first position.
Figure 2:
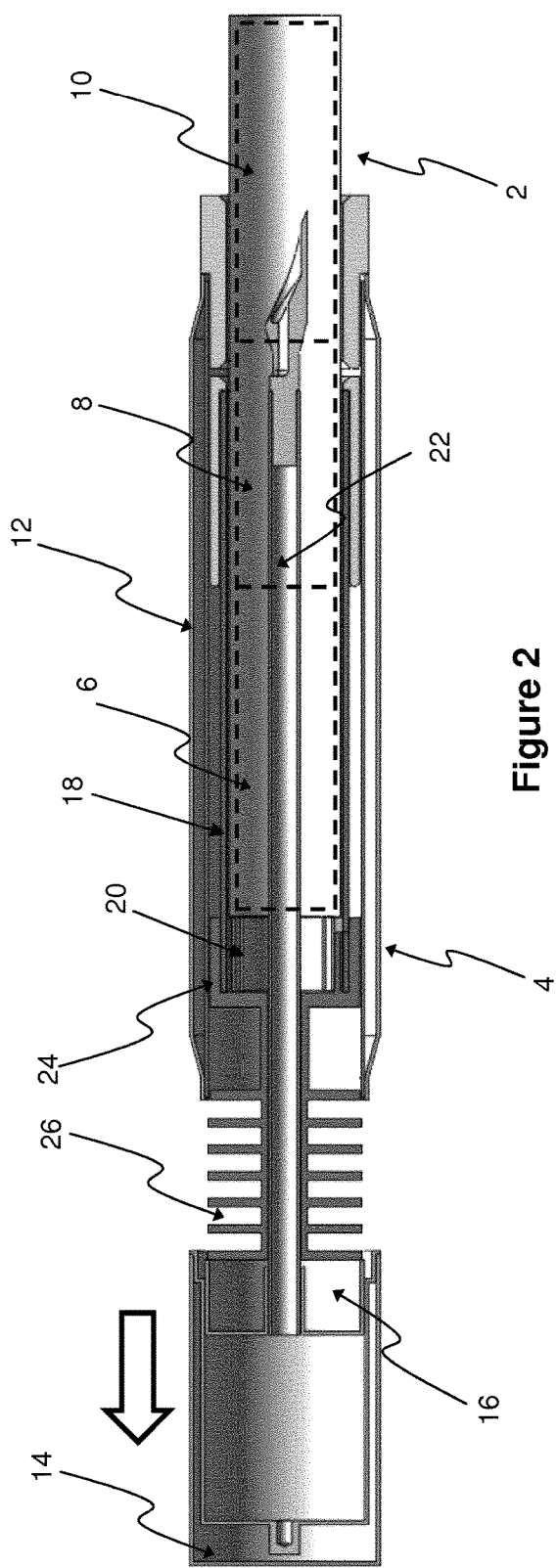
FIG. 2 shows a schematic longitudinal cross-section of the aerosol-generating system according to the first embodiment of the invention shown in FIG. 1 with the retractable cover of the aerosol-generating device moved to the second position.

FIG. 3 shows a schematic longitudinal cross-section of the aerosol-generating system according to the first embodiment of the invention shown in FIG. 2 with the retractable cover of the aerosol-generating device automatically returned to the first position from the second position; and FIG. 4 shows the mechanically actuated means for automatically returning the retractable cover of the aerosol-generating device of the aerosol-generating system according to the first embodiment of the invention shown in FIGS. 1-3 from the second position to the first position.

FIG. 1 schematically shows an aerosol-generating system according to a first embodiment of the invention comprising an aerosol-generating article 2 and an aerosol-generating device 4.

The aerosol-generating article 2 has an elongate cylindrical shape and comprises a housing comprising a first compartment 6 comprising a nicotine source, a second compartment 8 comprising a delivery enhancing compound source, and a third compartment 10 (shown by dashed lines in FIG. 1). The first compartment 6, the second compartment 8, and the third compartment 10 are arranged in series and in coaxial alignment within the aerosol-generating article 2. The first compartment 6 is located at the distal or upstream end of the aerosol-generating article 2. The second compartment 8 is located immediately downstream of and abuts the first compartment 6. The third compartment 10 is located downstream of the second compartment 8 at the proximal or downstream end of the aerosol-generating article 2. Instead of or in addition to the third compartment 10, the aerosol-generating article 2 may comprise a mouthpiece at the proximal or downstream end thereof.

The upstream and downstream ends of the first compartment 6 and the second compartment 8 of the aerosol-generating article 2 are sealed by frangible barriers (not shown). A heat transfer barrier (not shown) may be provided between the first compartment 6 and the second compartment 8 to reduce heat transfer between the nicotine source and the delivery enhancing compound source of the aerosol-generating article.

The aerosol-generating device 4 comprises a housing 12 comprising an elongate cylindrical cavity in which the aerosol-generating article 2 is received, a retractable cover 14, a heat exchanger 16, a first solid-liquid phase-change material 18 and a second solid-liquid phase-change material 20.

The aerosol-generating device 4 further comprises a piercing member 22 positioned centrally within the cavity of the aerosol-generating device 4 and extending along the major axis of the cavity.

As shown in FIG. 1, the length of the cavity is less than the length of the aerosol-generating article 2 so that the proximal or downstream end of the aerosol-generating article 2 protrudes from the cavity.

In the aerosol-generating system according to the first embodiment of the invention the first solid-liquid phase-change material 18 is positioned about the perimeter of the cavity and extends partially along the length of the cavity and fully around the circumference of the cavity. The second solid-liquid phase-change material 20 is positioned upstream of the first solid-liquid phase-change material 18 at the distal or upstream end of the cavity.

The heat exchanger 16 comprises a first portion 24 proximate to the cavity comprising a hollow thermally conductive tube and a second portion 26 distal to the cavity comprising a matrix of thermally conductive fins. The hollow thermally conductive tube of the first portion 24 of the heat exchanger 16 is in thermal contact with the matrix of thermally conductive fins of the second portion 26 of the heat exchanger 16. As shown in FIG. 1, the hollow thermally conductive tube of the first portion 24 of the heat exchanger 16 surrounds the distal or upstream end of the first solid-liquid phase-change material 18 and the second solid-liquid phase-change material 20.

In use, as the aerosol-generating article 2 is inserted into the cavity of the aerosol-generating device 4 the piercing member 22 of the aerosol-generating device 4 is inserted into the aerosol-generating article 2 and pierces the frangible barriers (not shown) at the upstream and downstream ends of the first compartment 6 and second compartment 8 of the aerosol-generating article 2. This allows a user to draw air into the housing of the aerosol-generating article 2 through the distal or upstream end thereof, downstream through the first compartment 6, the second compartment 8 and the third compartment 10 and out of the housing through the proximal or downstream end thereof.

Once the aerosol-generating article 2 is inserted into the cavity of the aerosol-generating device 4, the user pulls the retractable cover 14 of the aerosol-generating device 4 in the direction shown by the arrow in FIG. 2 in order to move the retractable cover 14 from the first position shown in FIG. 1, in which the retractable 14 covers the matrix of thermally conductive fins of the second portion 26 of the heat exchanger 16, to the second position shown in FIG. 2, in which the matrix of thermally conductive fins of the second portion 26 of the heat exchanger 16 is exposed for heating by a lighter.

Once the retractable cover 14 is in the second position shown in FIG. 2, the user heats the matrix of thermally conductive fins of the second portion of the heat exchanger 16 using a blue flame or torch lighter. Thermal energy captured from the lighter by the matrix of thermally conductive fins of the second portion 26 of the heat exchanger 16 is transferred from the matrix of thermally conductive fins of the second portion 26 of the heat exchanger 16 to the first solid-liquid phase-change material 18 via the hollow conductive tube of the first portion 24 of the heat exchanger 16. The thermal energy is absorbed by the first solid-liquid phase-change material 18 causing the temperature of the first solid-liquid phase-change material 18 to increase. When the temperature reaches the melting temperature of the first solid-liquid phase-change material 18, the first solid-liquid phase-change material 18 stores thermal energy as it changes phase from a solid to a liquid.

Once liquid, the temperature of the first solid-liquid phase-change material 18 will continue to increase upon further heating of the matrix of thermally conductive fins of the second portion 26 of the heat exchanger 16 by the blue flame or torch lighter. However, when the temperature of the first solid-liquid phase-change material 18 reaches the melting temperature of the second solid-liquid phase-change material 20, the second solid-liquid phase-change material 20 stores thermal energy as it changes phase from a solid to a liquid. This buffers the amount of thermal energy transferred to the first solid-liquid phase-change material 18 and so prevents overheating of the first solid-liquid phase-change material 18.

Once the matrix of thermally conductive fins of the second portion 26 of the heat exchanger 16 has reached a threshold temperature, the retractable cover 14 of the aerosol-generating device 4 is automatically returns in the direction shown by the arrow in FIG. 3 from the second position shown in FIG. 2, in which the matrix of thermally conductive fins of the second portion 26 of the heat exchanger 16 is exposed, to the first position shown in FIG. 3, in which the retractable 14 covers the matrix of thermally conductive fins of the second portion 26 of the heat exchanger 16. Heating of the matrix of thermally conductive fins of the second portion 26 of the heat exchanger 16 by the blue flame or torch lighter is then discontinued.

As shown in FIG. 4, the aerosol-generating device 4 comprises mechanically actuated means for automatically returning the retractable cover 14 from the second position shown in FIG. 2 to the first position shown in FIG. 3 when the matrix of thermally conductive fins of the second portion 26 of the heat exchanger 16 reaches the threshold temperature. In particular, the aerosol-generating device 4 comprises a spring (not shown) operable to bias the retractable cover 14 in the first position and latching means comprising a thermal bimetallic switch 28 operable to maintain the retractable cover 14 in the second position until the matrix of thermally conductive fins of the second portion 26 of the heat exchanger 16 reaches the threshold temperature.

In the first position the spring is in a folded configuration. As the user pulls the retractable cover 14 of the aerosol-generating device 4 in the direction shown by the arrow in FIG. 2 in order to move the retractable cover 14 from the first position shown in FIG. 1 to the second position shown in FIG. 2, the spring is stretched from the folded configuration. The retractable cover 14 is held in the second position by the thermal bimetallic switch 28, which comprises a bimetallic cantilever (circled in FIG. 4) that prevents the stretched spring from contracting.

The bimetallic cantilever changes shape upon heating and when the matrix of thermally conductive fins of the second portion 26 of the heat exchanger 16 reaches the threshold temperature the bimetallic cantilever bends out of place, thereby allowing the stretched spring to contract to the folded position. Contraction of the spring pulls the retractable cover 14 of the aerosol-generating device 4 in the direction shown by the arrow in FIG. 3 thereby returning the retractable cover 14 from the second position shown in FIG. 2, in which the matrix of thermally conductive fins of the second portion 26 of the heat exchanger 16 is exposed, to the first position shown in FIG. 3, in which the retractable 14 covers the matrix of thermally conductive fins of the second portion 26 of the heat exchanger 16.

The threshold temperature is preferably such that heating of the matrix of thermally conductive fins of the second portion 26 of the heat exchanger 16 by the blue flame or torch lighter is discontinued before the second solid-liquid phase-change material 20 completes the phase change from a solid to a liquid. Once heating of the matrix of thermally conductive fins of the second portion 26 of the heat exchanger 16 by the blue flame or torch lighter is discontinued, the temperature of the first solid-liquid phase-change material 18 decreases. Upon reaching its melting temperature, the first solid-liquid phase-change material 18 releases the stored thermal energy as it changes phase from a solid to a liquid. The stored thermal energy released by the first solid-liquid phase-change material 18 as it solidifies heats the first compartment 6 of the aerosol-generating article 2 received in the cavity of the aerosol-generating device 4 over an extended time period.

Once the retractable cover 14 of the aerosol-generating device 4 has returned from the second position shown in FIG. 2 to the first position shown in FIG. 3, the user draws on the proximal or downstream end of the aerosol-generating article 2 to draw air through the aerosol-generating article.

As the user draws air through the aerosol-generating article 2, nicotine vapour is released from the nicotine source in the first compartment 6 into the air stream drawn through the aerosol-generating article 2 and delivery enhancing compound vapour is released from the delivery enhancing compound source in the second compartment 8 into the air stream drawn through the aerosol-generating article 2. The nicotine vapour reacts with the delivery enhancing compound vapour in the gas phase in the second compartment 8 and the third compartment 10 to form an aerosol, which is delivered to the user through the proximal or downstream end of the aerosol-generating article 2.

The invention has been exemplified above by reference to an aerosol-generating system comprising an aerosol-generating article comprising a first compartment and a second compartment arranged in series within the aerosol-generating article. However, it will be appreciated that aerosol-generating systems according to the invention may comprise aerosol-generating articles comprising a first compartment and a second compartment arranged in parallel within the aerosol-generating article.

The invention has also been exemplified above by reference to an aerosol-generating device comprising a heat exchanger configured to heat a first solid-liquid phase-change material to a temperature above the melting point of the first solid-liquid phase-change material. However, it will be appreciated that aerosol-generating devices according to the invention may comprise heat exchangers that are configured to directly or indirectly heat an aerosol-generating article received in the cavity of the aerosol-generating device in other ways.

The invention has also been exemplified above by reference to an aerosol-generating system comprising an aerosol-generating article comprising a nicotine source and a delivery enhancing compound source. However, it will be appreciated that aerosol-generating devices according to the invention may be used in cooperation with other types of aerosol-generating article.

The invention claimed is:

1. An aerosol-generating device for an aerosol-generating system, the aerosol-generating device having a proximal end and a distal end opposed to the proximal end, and the aerosol-generating device comprising:
    a cavity disposed at the proximal end of the aerosol-generating device, the cavity being configured to receive an aerosol-generating article;
    a heat exchanger having a first portion proximate to the cavity and a second portion distal to the cavity being configured to capture heat from a lighter;
    a retractable cover disposed at the distal end of the aerosol-generating device,
    wherein the retractable cover is movable from a first position in which the retractable cover covers the second portion of the heat-exchanger to a second position in which the second portion of the heat exchanger is exposed for heating by a lighter,
    wherein the retractable cover is configured to automatically return from the second position to the first position when the second portion of the heat exchanger reaches a threshold temperature, thereby controlling a maximum temperature that can be reached by the second portion, and
    wherein the retractable cover is further configured to reduce or prevent capture of additional heat by the second portion of the heat exchanger, and to reduce or prevent transfer of additional heat by the first portion of the heat exchanger to the aerosol-generating article when the aerosol-generating article is received in the cavity;
    a first solid-liquid phase-change material that is a different material from the heat-exchanger, the first solid-liquid phase-change material being disposed about an outer perimeter of the cavity and disposed between the second portion of the heat exchanger and the proximal end of the aerosol-generating device,
    wherein the first portion of the heat-exchanger is configured to heat the first solid liquid phase-change material to a temperature above a melting point of the first solid liquid phase-change material; and
    a housing comprising the cavity and the first solid-liquid phase-change material.

2. The aerosol-generating device according to claim 1, wherein the retractable cover is manually movable from the first position to the second position.

3. The aerosol-generating device according to claim 1, wherein the retractable cover is movable away from the cavity from the first position to the second position and movable towards the cavity from the second position to the first position.

4. The aerosol-generating device according to claim 1, wherein the second portion of the heat exchanger comprises a plurality of thermally conductive fins.

5. The aerosol-generating device according to claim 1, wherein the first portion of the heat exchanger comprises one or more thermally conductive hollow tubes.

6. The aerosol-generating device according to claim 1, wherein the aerosol-generating device comprises a thermal bimetallic switch.

7. The aerosol-generating device according to claim 1, wherein the first solid-liquid phase-change material has a melting point of between 30 degrees Celsius and 70 degrees Celsius.

8. The aerosol-generating device according to claim 1, wherein the first solid-liquid phase-change material is sodium acetate trihydrate.

9. The aerosol-generating device according to claim 1, further comprising:
    a second solid-liquid phase-change material,
    wherein the melting point of the second solid-liquid phase-change material is higher than the melting point of the first solid-liquid phase-change material.

10. The aerosol-generating device according to claim 9, wherein the melting point of the second solid-liquid phase-change material is higher than the melting point of the first solid-liquid phase-change material by between 15 degrees Celsius and 25 degrees Celsius.

11. The aerosol-generating device according to claim 9, wherein the second solid-liquid phase-change material has a melting point of between 70 degrees Celsius and 90 degrees Celsius.

12. The aerosol-generating device according to claim 9, wherein the second solid-liquid phase-change material is hexatriacontane.

13. An aerosol-generating system, comprising:
    an aerosol-generating article; and
    an aerosol-generating device having a proximal end and a distal end opposed to the proximal end, and the aerosol-generating device comprising:
        a cavity disposed at the proximal end of the aerosol-generating device, the cavity being configured to receive the aerosol-generating article;
        a heat exchanger having a first portion proximate to the cavity and a second portion distal to the cavity being configured to capture heat from a lighter;
        a retractable cover disposed at the distal end of the aerosol-generating device,
        wherein the retractable cover is movable from a first position in which the retractable cover covers the second portion of the heat-exchanger to a second position in which the second portion of the heat exchanger is exposed for heating by a lighter,
        wherein the retractable cover is configured to automatically return from the second position to the first position when the second portion of the heat exchanger reaches a threshold temperature, thereby controlling a maximum temperature that can be reached by the second portion, and
        wherein the retractable cover is further configured to reduce or prevent capture of additional heat by the second portion of the heat exchanger, and to reduce or prevent transfer of additional heat by the first portion of the heat exchanger to the aerosol-generating article when the aerosol-generating article is received in the cavity;
        a first solid-liquid phase-change material that is a different material from the heat-exchanger, the first solid-liquid phase-change material being disposed about an outer perimeter of the cavity and disposed between the second portion of the heat exchanger and the proximal end of the aerosol-generating device, wherein the first portion of the heat-exchanger is configured to heat the first solid liquid phase-change material to a temperature above a melting point of the first solid liquid phase-change material; and a housing comprising the cavity and the first solid-liquid phase-change material.

14. The aerosol-generating system according to claim 13, wherein the aerosol-generating article comprises:

a nicotine source; and a delivery enhancing compound source.

15. The aerosol-generating system according to claim 14, wherein the delivery enhancing compound comprises an acid.

16. The aerosol-generating system according to claim 15, wherein the acid is pyruvic acid.

17. The aerosol-generating system according to claim 14, wherein the aerosol-generating article further comprises:

a first compartment comprising the nicotine source; and a second compartment comprising the delivery enhancing compound source; and wherein the aerosol-generating device further comprises:

a piercing member positioned within the cavity for piercing the first compartment and the second compartment of the aerosol-generating article.

* * * * *